US010317870B1

(12) United States Patent
Burnett et al.

(10) Patent No.: US 10,317,870 B1
(45) Date of Patent: Jun. 11, 2019

(54) MANUFACTURING CONTROLLER FOR AIRCRAFT

(71) Applicant: The Boeing Company, Chicago, IL (US)

(72) Inventors: Gabriel August Burnett, Newcastle, WA (US); Sean Francis Harrington, Kirkland, WA (US); Shabnam Zangeneh-Khamooshi, Everett, WA (US); Jonathan A. Fulton, Mount Pleasant, SC (US); Heather Noel Siflinger, Hanahan, SC (US); Jack Zinn Byers, Mount Pleasant, SC (US); Bianca Lui-Sargent, Mount Pleasant, SC (US); Benjamin J. Brelje, Edmonds, WA (US); Wallace C. O'Rear, Charleston, SC (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 15/224,147

(22) Filed: Jul. 29, 2016

(51) Int. Cl.
G05B 19/00 (2006.01)
G05B 19/19 (2006.01)

(52) U.S. Cl.
CPC .... *G05B 19/19* (2013.01); *G05B 2219/31044* (2013.01); *G05B 2219/31063* (2013.01)

(58) Field of Classification Search
CPC ............ G05B 19/41865; G05B 19/418; G05B 19/19; G06F 17/30958; G06Q 10/06; G06Q 10/0635; G06Q 10/0639; Y02P 90/20
USPC .................................................. 700/95, 100
See application file for complete search history.

(56) References Cited

U.S. PATENT DOCUMENTS

| 6,615,096 B1 * | 9/2003 | Durrant .................. G06Q 10/06 700/109 |
| 2007/0203912 A1 | 8/2007 | Thuve et al. |
| 2010/0198776 A1 * | 8/2010 | Wang ..................... G06Q 10/00 706/58 |
| 2014/0156047 A1 | 6/2014 | Song et al. |
| 2017/0098186 A1 * | 4/2017 | Song .................... G06Q 10/087 |

* cited by examiner

*Primary Examiner* — Chun Cao
(74) *Attorney, Agent, or Firm* — Yee & Associates, P.C.

(57) ABSTRACT

A method and apparatus for monitoring manufacturing of a product. An assembly task network for assembly tasks for assembling is searched by a computer system. The assembly task network defines dependencies between the assembly tasks. A probability of a group of downstream delays as a function of a state of assembly of components for the product being manufactured is calculated using a state of the assembly tasks, enabling modifying incomplete assembly tasks for the product that reduce the group of downstream delays.

38 Claims, 13 Drawing Sheets

MANUFACTURING CONTROLLER FOR AIRCRAFT

BACKGROUND INFORMATION

1. Field

The present disclosure relates generally to manufacturing products such as aircraft and, in particular, to managing the manufacturing of the aircraft in a manner that reduces delays in completing the manufacturing of the aircraft.

2. Background

The assembly of an aircraft is an extremely complex process. Hundreds of thousands of parts may be assembled for an aircraft.

The assembly of an aircraft may involve manufacturing different parts of the aircraft in geographically diverse locations. These different parts may then be finally assembled in a single location. For example, different portions of a fuselage of a composite aircraft may be assembled in different locations and flown to a central location where a final assembly line is located. Additionally, other parts such as engines, auxiliary power units, seats, computer systems, line replaceable units, or other components in the aircraft may be shipped to this final location for assembly to form an assembled aircraft.

The different tasks performed for manufacturing and assembling the parts to form components may have dependencies. For example, a first task for installing a brake assembly may need to be performed prior to performing a second task for inspecting an installation of the brake assembly. As another example, installing seats in a passenger cabin may require the floor to be completed prior to seat assembly.

Delays may occur for a number of different reasons. For example, a part for an assembly may be unavailable, the part may have an inconsistency that needs rework, conflicts may be present in scheduling the first task, or some other cause may be present for an inability to perform the first task. If the first task cannot be completed on time, then the second task is delayed until the completion of the first task when a dependency is present between the two tasks.

Depending on how many delays are present and which tasks are delayed, completing the manufacturing of the aircraft for delivery to a customer may or may not be delayed. As the number of delays increases, completing the manufacturing of the aircraft for delivery to a customer is more likely to take more time than desired.

Therefore, it would be desirable to have a method and apparatus that take into account at least some of the issues discussed above, as well as other possible issues. For example, it would be desirable to have a method and apparatus that overcome a technical problem with reducing delays in manufacturing an aircraft.

SUMMARY

An embodiment of the present disclosure provides a manufacturing controller. The manufacturing controller comprises an assembly task network and an assembly task network analyzer. The assembly task network includes assembly tasks for assembling components in a product. The assembly task network defines dependencies between the assembly tasks. The assembly task network analyzer is configured to search the assembly task network for the assembly tasks and calculate a probability of a group of downstream delays as a function of a state of assembly of the components for the product being manufactured using the assembly tasks, enabling modifying incomplete assembly tasks for the product that reduces the group of downstream delays.

Another embodiment of the present disclosure provides a manufacturing controller for an aircraft. The manufacturing controller comprises an assembly task network, a manufacturing assembly monitor, and an assembly task network analyzer. The assembly task network includes assembly tasks for assembling components in the aircraft. The assembly task network defines dependencies between assembly tasks. The manufacturing assembly monitor is configured to receive task data in real time and update the assembly task network with the task data. The task data includes a state of assembly of the components for a product being manufactured. The assembly task network analyzer is configured to search the assembly task network for the assembly tasks and calculate a probability of a group of downstream delays as a function of the state of assembly of the components for the product being manufactured identified from a state of the assembly tasks. The assembly task network analyzer identifies a milestone in danger of being delayed based on the state of a cluster of the assembly tasks for the milestone, enabling modifying incomplete assembly tasks for the product that reduce the group of downstream delays.

Yet another embodiment of the present disclosure provides a method for monitoring manufacturing of a product. An assembly task network for assembly tasks for assembling is searched by a computer system. The assembly task network defines dependencies between the assembly tasks. A probability of a group of downstream delays as a function of a state of assembly of components for the product being manufactured is calculated using a state of the assembly tasks, enabling modifying incomplete assembly tasks for the product that reduce the group of downstream delays.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
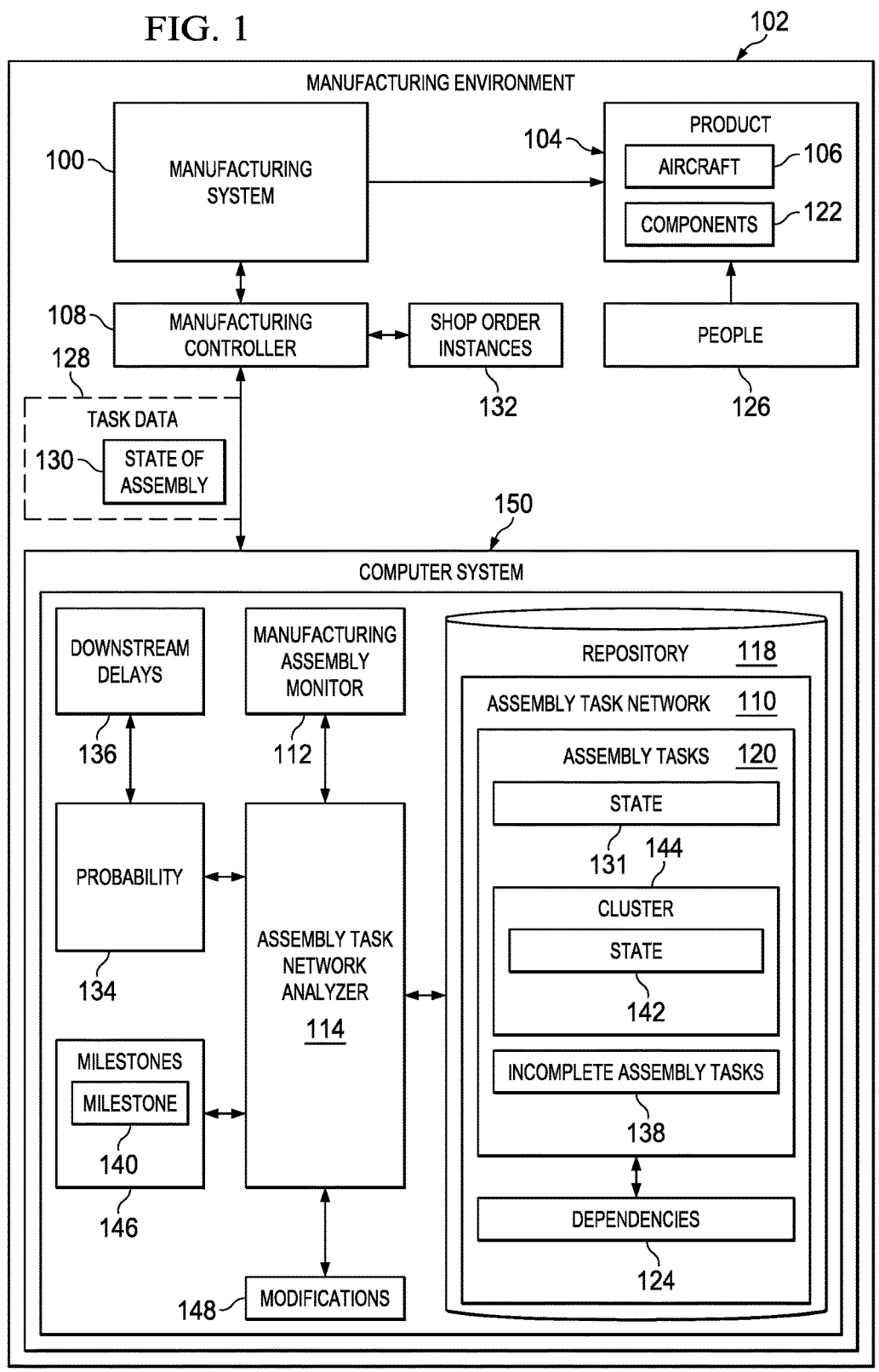
FIG. 1 is an illustration of a block diagram of a manufacturing environment in accordance with an illustrative embodiment.

The illustrative embodiments recognize and take into account one or more different considerations. For example, the illustrative embodiments recognize and take into account that assembly tasks may be organized and assigned using a task management system. The task management system manages the assembly tasks. The task management system may assign the tasks, track completed tasks, and track uncompleted tasks.

The illustrative embodiments recognize and take into account, however, that current task management systems are unable to identify how delays in tasks affect downstream events in manufacturing an aircraft. These downstream events may include milestones in manufacturing the aircraft.

The milestones are events that occur during the manufacturing that represent a stage in the manufacturing that may be used to mark the manufacturing of the aircraft. For example, the milestones may be selected from at least one of a critical design review, an engine test, a first flight, a certification, a delivery to a customer, movement to a manufacturing area, movement out of the manufacturing area, painting an airplane with an airplane livery, a first fueling of the airplane to check for fuel leaks, or some other suitable event.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments recognize and take into account that in manufacturing the aircraft, the aircraft or parts of the aircraft may move from one manufacturing location to another manufacturing location. The manufacturing location may be in the same facility or in a different facility. The illustrative embodiments recognize and take into account that movement to different locations may result in delays if the statuses of the assembly tasks are not carefully taken into account. Often times, a location downstream in the manufacturing may not have complete knowledge of the condition of the aircraft or parts for the aircraft that are received.

Thus, the illustrative embodiments recognize and take into account that it would be desirable to have a method and apparatus that identify delays that may occur for the milestones. The illustrative embodiments recognize and take into account that it would be desirable to identify these delays based on at least one of the condition of the aircraft and the overall production system. The condition of the aircraft may be based on identifying which assembly tasks have been completed and which assembly tasks were not completed for the product. Knowing the overall production system may include, for example, the availability of parts, labor, equipment, and other resources needed to perform assembly tasks in manufacturing the aircraft.

In one illustrative example, a manufacturing controller comprises an assembly task network and an assembly task network analyzer. The assembly task network includes assembly tasks for assembling components in a product. The assembly task network defines dependencies between the assembly tasks. The assembly task network analyzer is configured to search the assembly task network for the assembly tasks and calculate a probability of a group of downstream delays as a function of a state of assembly of the components for the product being manufactured using the assembly tasks, enabling modifying incomplete assembly tasks for the product that reduces the group of downstream delays.

With reference now to the figures and, in particular, with reference to FIG. 1, an illustration of a block diagram of a manufacturing environment is depicted in accordance with an illustrative embodiment. As depicted, manufacturing system 100 in manufacturing environment 102 is used to manufacture product 104. In this example, product 104 takes the form of aircraft 106.

In this illustrative example, manufacturing controller 108 operates to aid in the manufacturing of product 104 by manufacturing system 100. As depicted, manufacturing controller 108 includes assembly task network 110, manufacturing assembly monitor 112, and assembly task network analyzer 114.

Assembly task network 110 is a data structure that is stored in repository 118 in manufacturing controller 108. Repository 118 may be a database or other storage system. Assembly task network 110 includes assembly tasks 120 for assembling components 122 in product 104. Assembly task network 110 defines dependencies 124 between assembly tasks 120.

As depicted, assembly tasks 120 are assigned to people 126 to manufacture product 104. People 126 operate equipment and other machinery in manufacturing system 100 to manufacture product 104. In some cases, assembly tasks 120 may be performed by manufacturing system 100 without needing people 126. For example, robotic arms, crawlers, computer-controlled riveting machines, and other types of equipment may operate without needing directions from people 126 to manufacture product 104.

An assembly task is a piece of work that includes one or more steps or operations that are performed by a person to assemble one or more of components 122 that form product 104. As depicted, components 122 are selected from at least one of an assembly of parts, a subassembly of the parts, a system, or a subsystem. The piece of work may include, for example, connecting parts to each other, inspecting an assembly, or other suitable pieces of work that are performed to assemble components 122 to form product 104.

Dependencies 124 are relationships between assembly tasks 120. For example, when a first assembly task has a dependency on a second assembly task, a delay in the first assembly task may cause a delay in performing the second assembly task. In another example, the first assembly task and the second assembly task may have a dependency on a third assembly task. In this example, a delay in the third assembly task may cause at least one of the first assembly task or the second assembly task to be delayed.

In this illustrative example, manufacturing assembly monitor 112 is configured to receive task data 128 in real time and update assembly task network 110 with task data 128. Receiving task data 128 in real time means that task data 128 is sent to manufacturing assembly monitor 112 as quickly as possible without intended delay when task data 128 is generated. Task data 128 includes at least one of state of assembly 130 of components 122 for product 104 being manufactured, state 131 of assembly tasks 120, or other information about the manufacturing of product 104.

State of assembly 130 indicates the level of completion for components 122. For example, state of assembly 130 may indicate whether an assembly of a component in components 122 has been completed. State of assembly 130 may indicate what parts or pieces have been assembled to form a component as well as what parts or pieces still need to be assembled. In the illustrative example, state 131 may indicate whether an assembly task in assembly tasks 120 is unassigned, assigned but not yet started, in progress, completed, delayed, or some other state for assembly task 120.

As depicted, task data 128 is received from manufacturing controller 108. Manufacturing controller 108 performs at least one of the assigning or monitoring of the performance of assembly tasks 120. For example, manufacturing controller 108 may generate shop order instances (SOIs) 132 for assembly tasks 120. Shop order instances 132 are assigned to people 126 to perform assembly tasks 120. Further, manufacturing controller 108 may also monitor the performance of assembly task 120 assigned to shop order instances 132.

As depicted, assembly task network analyzer 114 is configured to search assembly task network 110 and calculate probability 134 of a group of downstream delays 136 as a function of state of assembly 130 of components 122 for product 104 being manufactured. As used herein, "a group of," when used with reference to items, means one or more items. For example, "a group of downstream delays 136" is one or more of downstream delays 136.

This system enables modifying a group of incomplete assembly tasks 138 in assembly tasks 120 for product 104 that reduces the group of downstream delays 136. For example, assembly task network analyzer 114 is configured to identify milestone 140 that is in danger of being delayed based on state 142 of cluster 144 of assembly tasks 120 for milestone 140.

In this depicted example, cluster 144 is selected from one of a spatial cluster and a system cluster. A spatial cluster is a grouping of assembly tasks 120 that is within a selected distance of each other to be considered a cluster. Each of assembly tasks 120 has a location in product 104 where each of components 122 is located when assembly tasks 120 are performed.

A system cluster is a grouping of assembly tasks 120 for a particular system. For example, the system cluster may be a grouping of assembly tasks 120, a hydraulic system, a braking system, an in-flight entertainment system, an environmental system, or some other type of system in product 104.

Assembly task network analyzer 114 may identify the probability of the group of downstream delays 136 for a group of milestones 146 for product 104. In other words, assembly task network analyzer 114 may provide a focus on when delays for the group of milestones 146 may occur. When product 104 is aircraft 106, the group of milestones 146 may be selected from at least one of an engine run, a first flight, a certification, a delivery to a customer, or some other milestone related to manufacturing of aircraft 106.

The focus on the group of milestones 146 allows for an ability to make modifications to the group of incomplete assembly tasks 138 that may make it more likely that the group of milestones 146 can be met. In this manner, resources such as people, parts, and manufacturing equipment may be practically assigned to reduce downstream impact on the manufacturing of product 104. In this illustrative example, incomplete assembly tasks 138 are assembly tasks 120 having state 131 selected from at least one of unassigned, assigned but not yet get started, in progress, delayed, or some other state where a component has not yet been completed.

Further, assembly task network analyzer 114 may identify a group of modifications 148 to the group of incomplete assembly tasks 138 for product 104 that reduces the group of downstream delays 136. The group of modifications 148 may take a number of different forms. For example, the group of modifications 148 may be selected from at least one of reassigning an assembly task to another team, substituting an unavailable part with an equivalent part, changing an order of incomplete assembly tasks 138, increasing overtime work, adding shifts, or some other suitable modification to the group of incomplete assembly tasks 138. The reduction in the group of downstream delays 136 may reduce delays in the group of milestones 146 in the manufacturing of product 104.

One or more of the components in manufacturing controller 108 may be implemented in software, hardware, firmware, or a combination thereof. For example, at least one of manufacturing assembly monitor 112 or assembly task network analyzer 114 may be implemented in this manner. When software is used, the operations performed by manufacturing controller 108 may be implemented in program code configured to run on hardware, such as a processor unit. When firmware is used, the operations performed by manufacturing controller may be implemented in program code and data and stored in persistent memory to run on a processor unit. When hardware is employed, the hardware may include circuits that operate to perform the operations in manufacturing controller.

In the illustrative examples, the hardware may take a form selected from at least one of a circuit system, an integrated circuit, an application specific integrated circuit (ASIC), a programmable logic device, or some other suitable type of hardware configured to perform a number of operations.

With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, one or more components in manufacturing controller 108 may be located in computer system 150. Computer system 150 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with reducing delays in the manufacturing of product 104. As a result, one or more technical solutions may provide a technical effect of enabling a reduction in delays such as downstream delays 136 that may affect the group of milestones 146 for the manufacturing of product 104 such as aircraft 106. Assembly task network analyzer 114 may enable modifications 148 to incomplete assembly tasks 138 that may reduce downstream delays 136 in a manner that reduces the likelihood that the group of milestones 146 may be missed.

As a result, computer system 150 operates as a special purpose computer system in which assembly task network analyzer 114 in computer system 150 enables reducing downstream delays 136. In particular, assembly task network analyzer 114 transforms computer system 150 into a special purpose computer system as compared to currently available general computer systems that do not have assembly task network analyzer 114.

Figure 2:
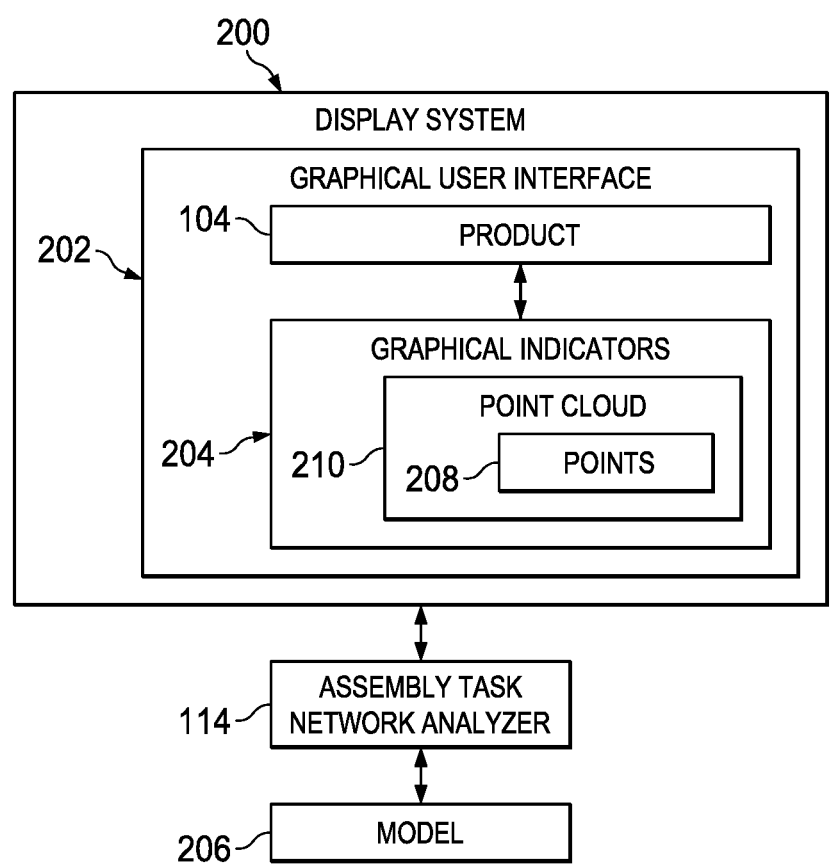
FIG. 2 is an illustration of a block diagram of a state assembly for a product in accordance with an illustrative embodiment.

With reference now to FIG. 2, an illustration of a block diagram of a state assembly for a product is depicted in accordance with an illustrative embodiment. In this illustrative example, assembly task network analyzer 114 is in communication with display system 200.

As depicted, assembly task network analyzer 114 causes graphical user interface 202 to be displayed on display system 200. In this illustrative example, assembly task network analyzer 114 displays product 104 and a group of graphical indicators 204 graphically indicating state of assembly 130 for each of assembly tasks 120 in FIG. 1 on display system 200.

As depicted, the display of product 104 in graphical user interface 202 may be made using model 206 for product 104. In this illustrative example, graphical indicators 204 may be displayed in locations in or on the display of model 206 for product 104 to graphically indicate state of assembly 130 in FIG. 1.

Graphical indicators 204 may take various forms. In one illustrative example, graphical indicators 204 may take the form of points 208 in point cloud 210. For example, assembly task network analyzer 114 may display product 104 as point cloud 210 in which each point in points 208 represents a component assembled by a group of assembly tasks 120 in FIG. 1. The locations for points 208 are based on the locations of where components 122 formed by assembly tasks 120 in FIG. 1 are located in product 104. These locations are correlated within model 206 to identify the locations for points 208 in point cloud 210. In another illustrative example, an outline of product 104 may be displayed using model 206 in addition to displaying points 208 in point cloud 210.

Figure 3:
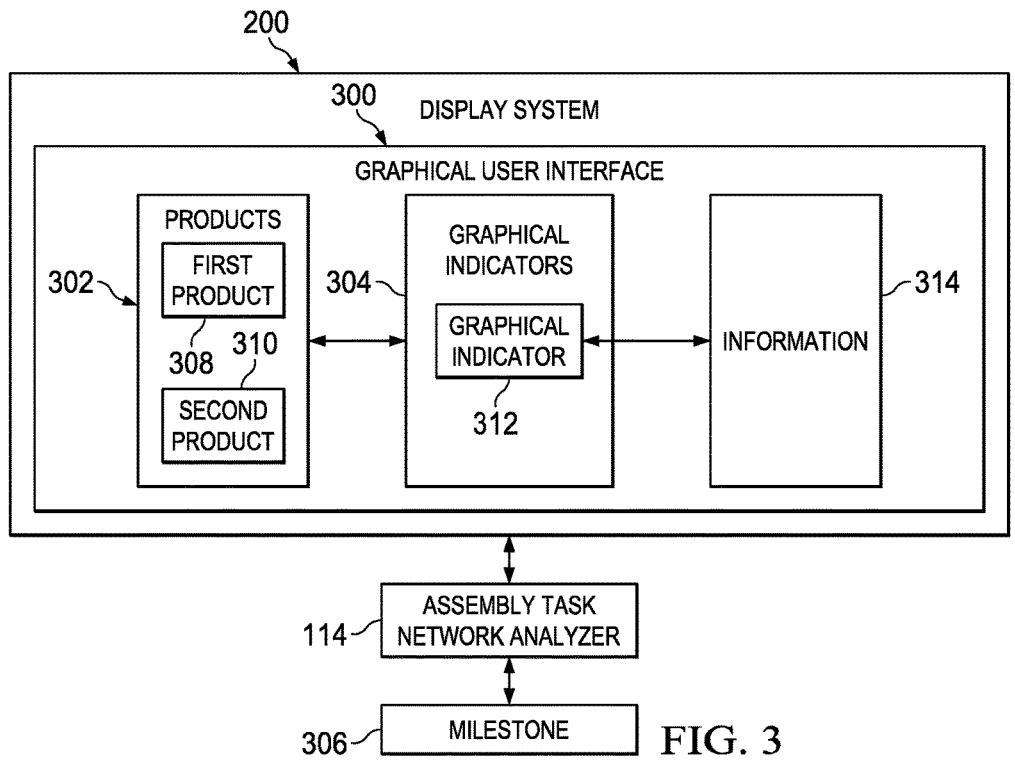
FIG. 3 is an illustration of a block diagram of a state assembly for a product in accordance with an illustrative embodiment.

With reference to FIG. 3, an illustration of a block diagram of a state assembly for a product is depicted in accordance with an illustrative embodiment. In this illustrative example, assembly task network analyzer 114 displays graphical user interface 300 on display system 200. In this illustrative example, graphical user interface 300 displays products 302. Products 302 are displayed in association with graphical indicators 304. In this example, graphical indicators 304 may indicate a risk of missing milestone 306 for each of products 302.

In this example, a delay in first product 308 in products 302 may cause downstream delays 136 in FIG. 1 in second product 310 in products 302. The probability of downstream delays 136 may be indicated through graphical indicators 304. Graphical indicators 304 may take a number of different forms. For example, graphical indicators 304 may be selected from at least one of text, color, flashing lines, animation, icons, or other suitable types of graphical indicators.

Further, the selection of graphical indicator 312 in graphical indicators 304 may cause information 314 to be displayed within graphical user interface 300. Information 314 may identify assembly tasks with delays, incomplete assembly tasks, a probability of missing milestone 306, or other suitable types of information.

Figure 4:
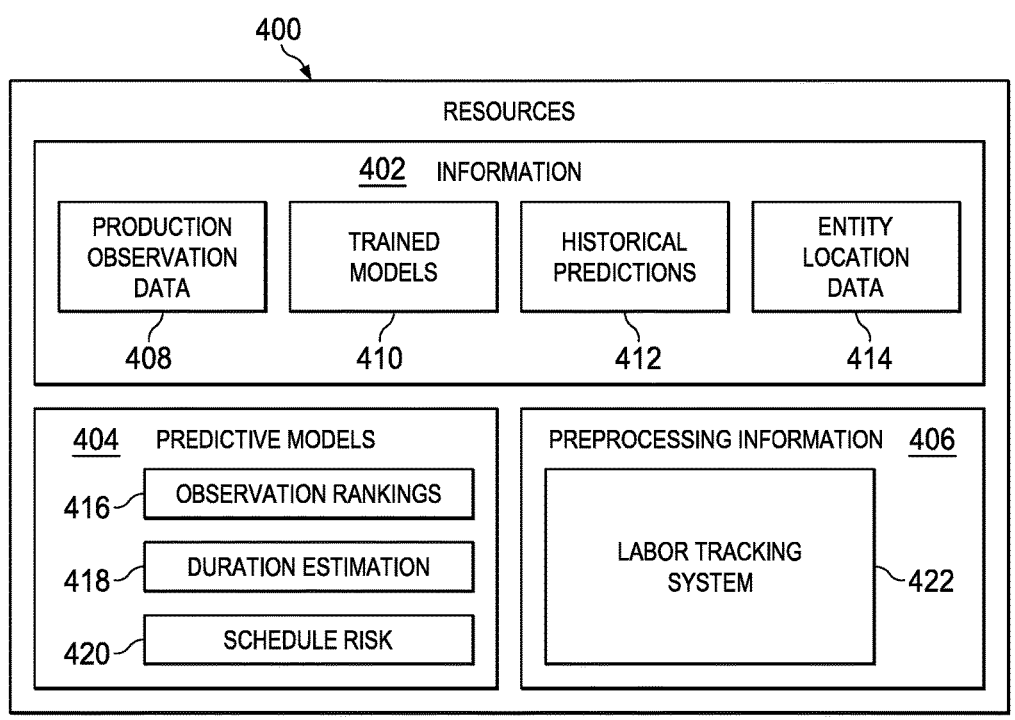
FIG. 4 is an illustration of a block diagram of resources used by an assembly task network analyzer in accordance with an illustrative embodiment.

With reference now to FIG. 4, an illustration of a block diagram of resources used by an assembly task network analyzer is depicted in accordance with an illustrative embodiment. Illustrative examples of resources 400 used by assembly task network analyzer 114 in FIGS. 1-3 are shown. In this example, resources 400 include information 402, predictive models 404, and preprocessing information 406.

Information 402 includes production observation data 408, trained models 410, historical predictions 412, and entity location data 414. Predictive models 404 include observation rankings 416, duration estimation 418, and schedule risk 420. Preprocessing information 406 includes labor tracking system 422.

In this illustrative example, information 402 is used by assembly task network analyzer 114 in FIGS. 1-3 for characterizing the current state of the airplane and making predictions about the likelihood of future manufacturing delays. Production observation data 408 is information about the status of assembly tasks. This information is present for each airplane that is being manufactured. The status of an assembly task may be, for example, scheduled but not started, not scheduled, in progress, and completed. Production observation data 408 is by assembly task network analyzer 114 to rate and update assembly task network 110 in FIG. 1.

Trained models 410 are a collection of machine-learning models. Trained models 410 may be implemented using at least one of a neural network, a Bayesian network, a fuzzy logic network, or some other suitable type of machine-learning model.

As depicted, trained models 410 are trained on historical production data for different types of products such as airplanes. Trained models 410 are used by assembly task network analyzer 114 in FIGS. 1-3 to predict delays for products that are being manufactured. In the list of examples, the delays predicted are delays and milestones for products such as airplanes.

Entity location data 414 is a current location of each airplane. For example, entity location data 414 may identify the location of each airplane in an assembly line in which multiple airplanes are assembled and move from location to location.

As depicted, predictive models 404 are used by assembly task network analyzer 114 in FIGS. 1-3 to provide a mathematical approach to prioritizing tasks that are needed to reach milestones, especially critical milestones. For example, a critical milestone is a delivery date for an on-time delivery of an airplane. Observation rankings 416 are models of assembly tasks. In this model, the assembly tasks are ranked based on an estimated duration and whether the assembly tasks are preventing other similar assembly tasks from being performed. This model is used by assembly task network analyzer 114 to provide a prioritized list of assembly tasks for operators to perform work on an airplane.

In this illustrative example, duration estimation 418 is a model of durations for new assembly tasks for which historical data is absent. Duration estimation 418 may implement a matching algorithm to find assembly tasks with historical information that are similar enough to the new assembly tasks. This matching of assembly tasks may be performed based on descriptions of the assembly tasks. This model is used by assembly task network analyzer 114 to estimate the duration of the assembly tasks in assembly task network 110 in FIG. 1.

As depicted, schedule risk 420 is a model of risk levels. Schedule risk 420 may be used to predict a risk level for the likelihood that a milestone may be missed. Schedule risk 420 is used by operations personnel to determine which airplanes relative to each other will require additional resources such as at least one of more mechanics or more time in a production position.

In preprocessing information 406, labor tracking system 422 is used by assembly task network analyzer 114 to correct inaccuracies in the manner in which labor is charged. Labor tracking system 422 may be used to obtain more accurate hour data about labor used in performing the assembly tasks.

The illustrations of manufacturing environment 102 in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although product 104 in FIGS. 1-2 has been described with respect to aircraft 106 in FIG. 1, product 104 may take other forms. The illustrative examples may be applied to other types of platforms. For example, product 104 may be, for example, a mobile platform, a stationary platform, a land-based structure, an aquatic-based structure, and a space-based structure. More specifically, product 104 may be a surface ship, a tank, a personnel carrier, a train, a tank, a spacecraft, a space station, a satellite, a submarine, an automobile, a power plant, a bridge, a dam, a house, a manufacturing facility, a building, an engine, a turbine, and other suitable types of products.

In yet another illustrative example, one or more products in addition to product 104 may be present. The group of incomplete assembly tasks 138 in FIG. 1 may apply to other products that may be manufactured by manufacturing system 100 in FIG. 1. In other words, modifications 148 in FIG. 1 may be made to one or more of incomplete assembly tasks 138 for other products that are to be manufactured by manufacturing system 100.

As another example, in FIG. 1, assembly task network 110 may include other information in addition to assembly tasks 120. For example, assembly task network 110 may define at least one of a predecessor dependency in dependencies 124 in FIG. 1, a successor dependency in dependencies 124, a planned completion date, a planned start date, a planned duration, a resource requirement, a work location, or other information that is used to identify the group of downstream delays 136 in FIG. 1 and modifications 148 to the group of incomplete assembly tasks 138.

In still another example, in FIG. 2, graphical indicators 204 may take other forms other than points 208 in point cloud 210. For example, graphical indicators 204 may also include at least one of text, color, lines, icons, or other suitable types of graphical indicators that may be used in addition to or in place of points 208.

In another illustrative example, processes and models in resources 400 in FIG. 4 may be implemented as part of assembly task network analyzer 114 in FIGS. 1-3, accessed by assembly task network analyzer 114, or some combination thereof. For example, trained models 410 in FIG. 4 may be implemented as part of assembly task network analyzer 114 while production observation data 408 in FIG. 4 may be located in a repository accessed by assembly task network analyzer 114.

Figure 5:
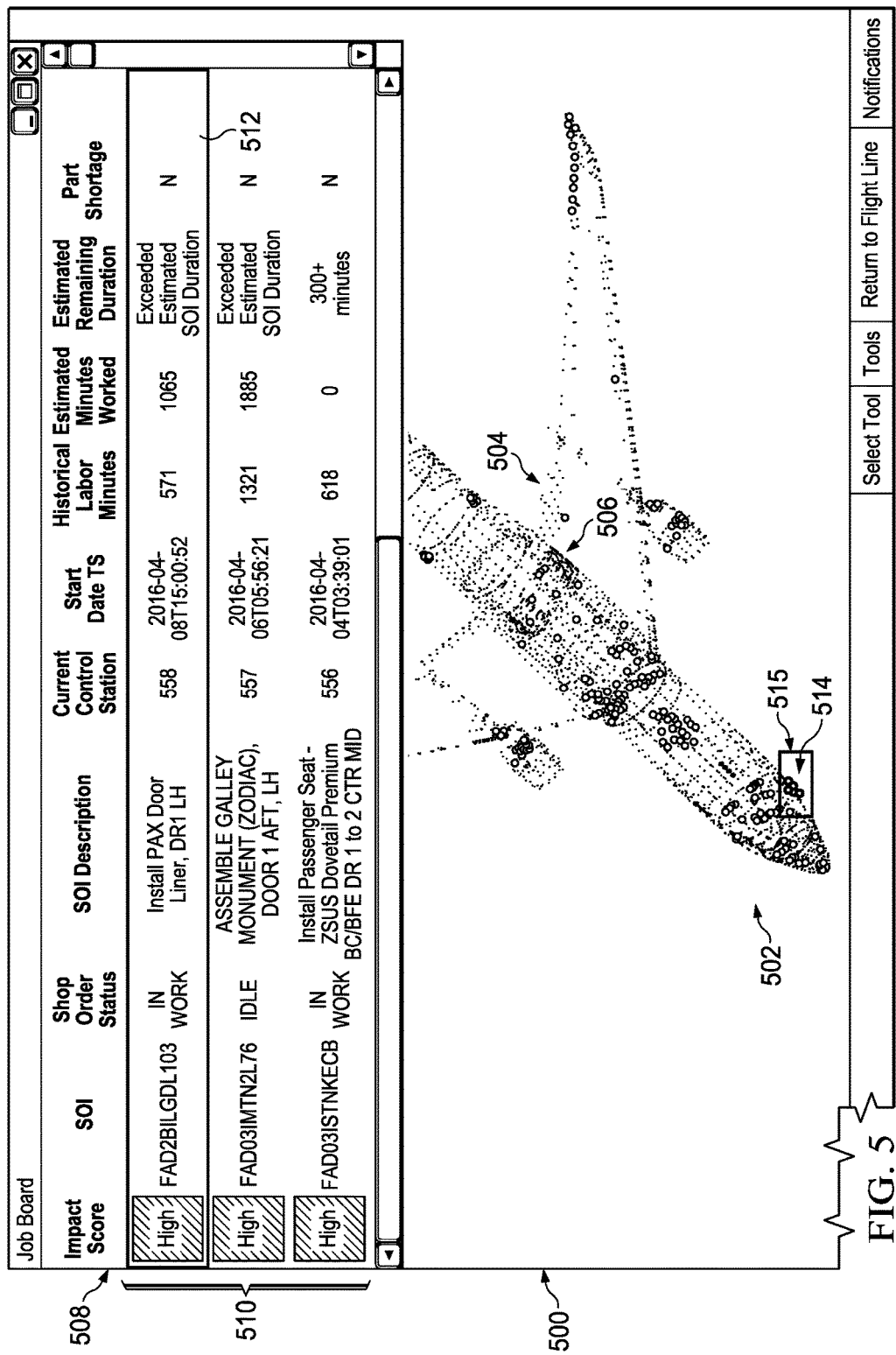
FIG. 5 is an illustration of a product displayed using a point cloud in accordance with an illustrative embodiment.

Turning next to FIG. 5, an illustration of a product displayed using a point cloud is depicted in accordance with an illustrative embodiment. In this illustrative example, graphical user interface 500 is an example of one implementation for graphical user interface 300 displayed by assembly task network analyzer 114 in FIG. 3.

In this example, an aircraft in the form of airplane 502 is represented by point cloud 504 displayed in graphical user interface 500. Points 506 in point cloud 504 indicate locations where tasks are performed to manufacture airplane 502.

Further, graphical indicators, such as color, may be used with points 506 in point cloud 504 to indicate at least one of a status of the assembly tasks or a state of assembly for components for which the assembly tasks are performed. For example, green may be used to indicate assembly tasks that are still being performed while completed tasks may be indicated using blue.

Further, window 508 may display assembly tasks 510. A selection of assembly task 512 in assembly tasks 510 in window 508 results in point 514 in points 506 being graphically indicated. For example, box 515 may be displayed in red to indicate that point 514 corresponds to the selection of assembly task 512. In this manner, a person viewing graphical user interface 500 may visually see where a particular assembly task is to be performed, is being performed, or has been performed.

Additionally, point 514 in points 506 may be selected to obtain more information about a particular assembly task. For example, if window 508 is not currently being displayed, a selection of point 514 causes the display of assembly task 512 in window 508 in graphical user interface 500.

Figure 6:
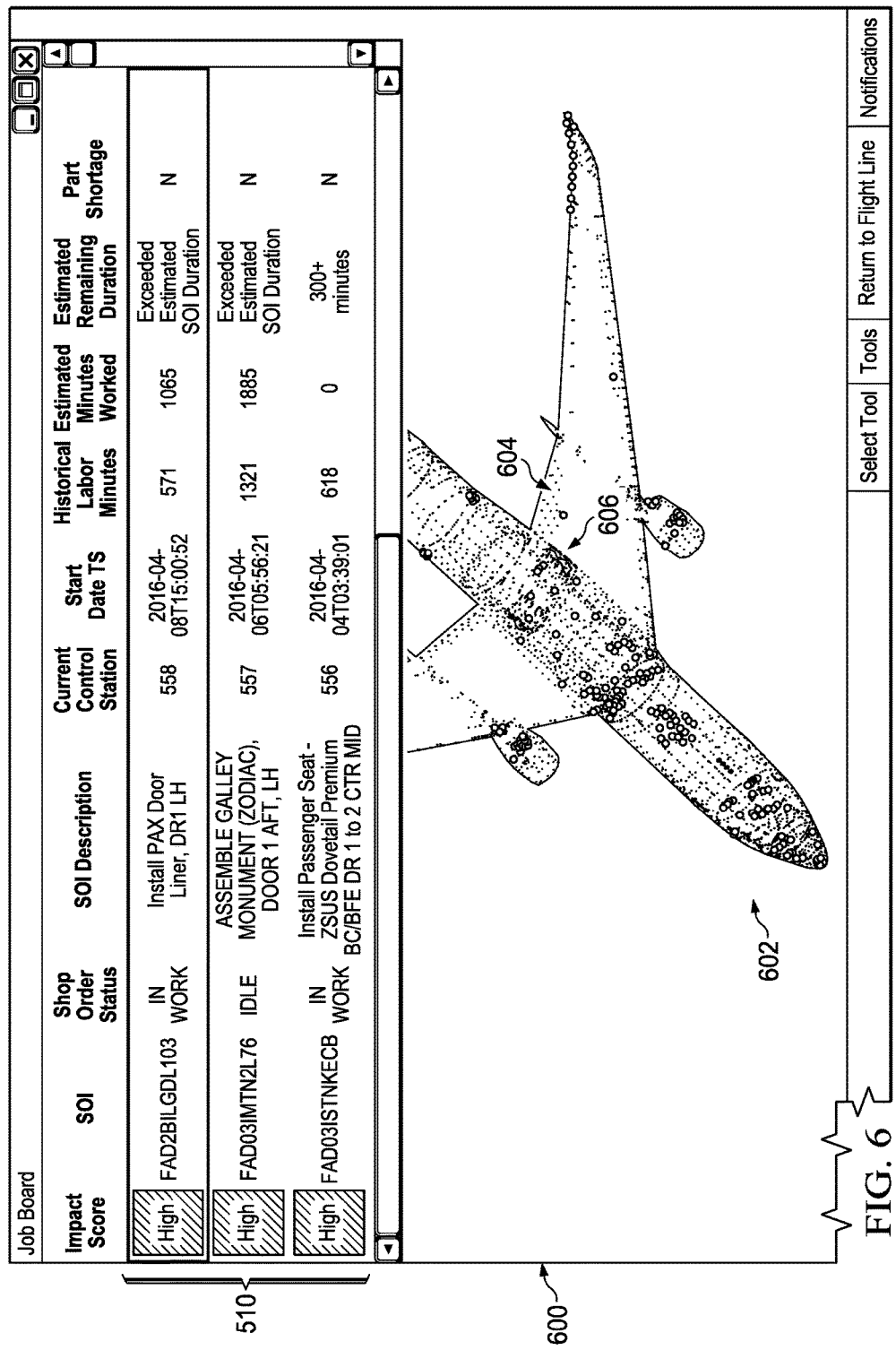
FIG. 6 is an illustration of a product displayed using a point cloud in accordance with an illustrative embodiment.

Turning next to FIG. 6, an illustration of a product displayed using a point cloud is depicted in accordance with an illustrative embodiment. In this illustrative example, graphical user interface 600 is an example of one implementation for graphical user interface 300 displayed by assembly task network analyzer 114 in FIG. 3.

In this example, airplane 602 is displayed in graphical user interface 600. Additionally, point cloud 604 displayed in airplane 602 is displayed in graphical user interface 600. Point cloud 604 comprises points 606 in which points 606 indicate locations where components are located when assembly tasks are performed to assemble the components to manufacture airplane 602. In a similar fashion to graphical user interface 500 in FIG. 5, points 606 may be displayed using colors or other types of graphical indicators to indicate the status of at least one of an assembly task or a state of assembly of a component.

Figure 7:
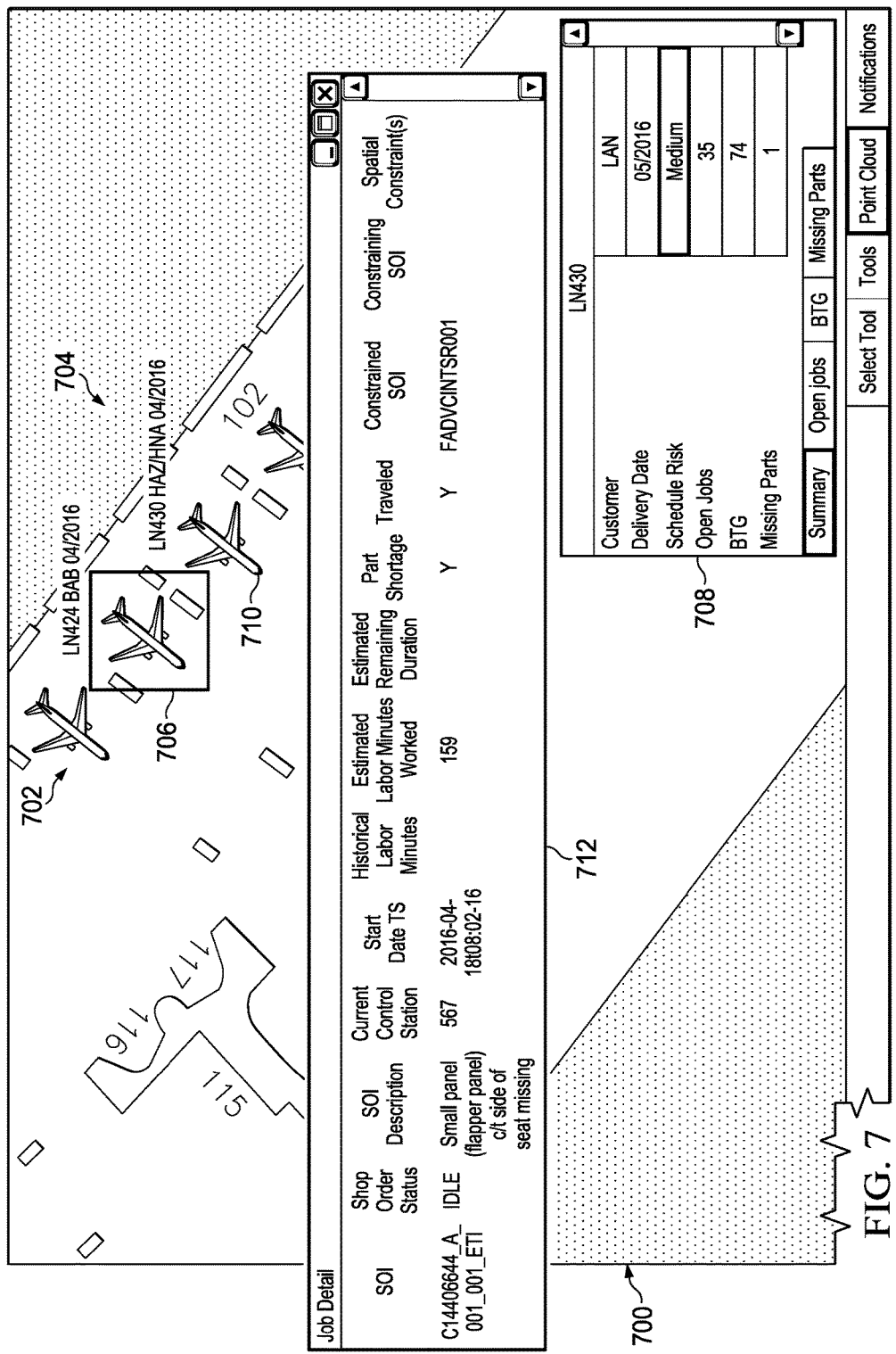
FIG. 7 is an illustration of products displayed in a graphical user interface in accordance with an illustrative embodiment.

With reference to FIG. 7, an illustration of products displayed in a graphical user interface is depicted in accordance with an illustrative embodiment. In this illustrative example, graphical user interface 700 is an example of one implementation for graphical user interface 300 displayed by assembly task network analyzer 114 in FIG. 3.

In this example, airplanes 702 are displayed in manufacturing area 704 in graphical user interface 700. As depicted, airplanes 702 are in a manufacturing line in which airplanes 702 travel from location to location in manufacturing area 704 during manufacturing of airplanes 702.

Airplanes 702 may be displayed with graphical indicators to indicate a status of airplanes 702. For example, green may be used to indicate the status as being on time and yellow may be used to indicate a potential delay. In this example, box 706 is displayed in red and is used to indicate a risk of missing a milestone.

As depicted, window 708 displays assembly tasks that are open to airplane 710 in airplanes 702. Window 712 may be displayed in graphical user interface 700 to show assembly tasks for airplane 710.

In this illustrative example, assembly task network analyzer 114 in FIGS. 1-3 may graphically indicate which ones of airplanes 702 are of greatest risk to miss one or more milestones. Delays in one of airplanes 702 may cause delays for other ones of airplanes 702 that are downstream in a manufacturing line for airplanes 702.

Figure 8:
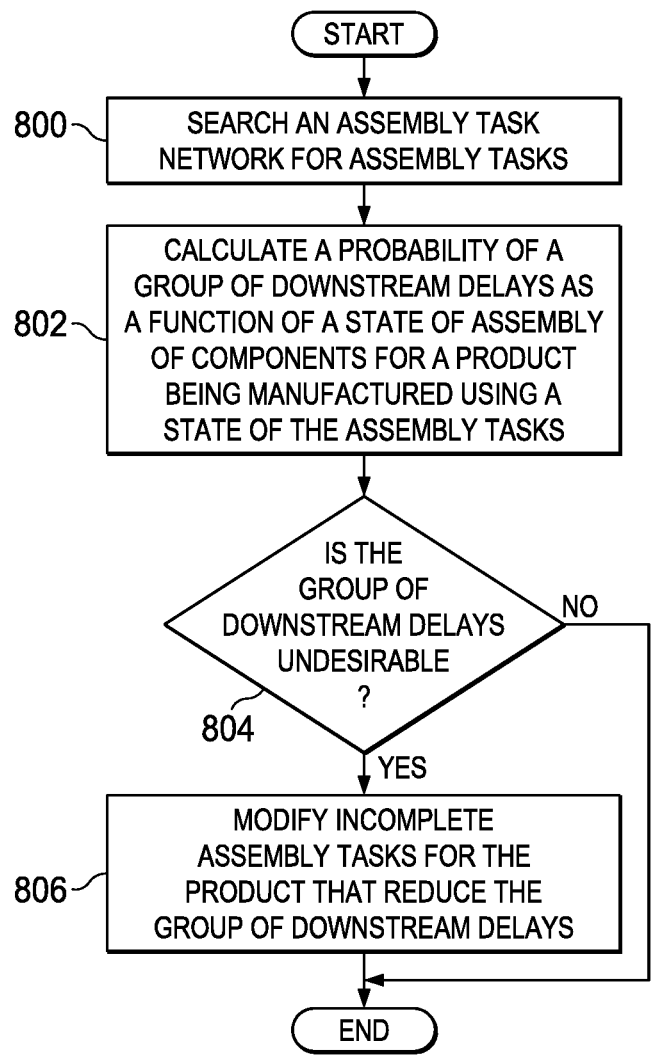
FIG. 8 is an illustration of a flowchart of a process for monitoring manufacturing of a product in accordance with an illustrative embodiment.

Turning next to FIG. 8, an illustration of a flowchart of a process for monitoring manufacturing of a product is depicted in accordance with an illustrative embodiment. The process illustrated in FIG. 8 may be implemented in assembly task network analyzer 114 in FIGS. 1-3.

The process begins by searching an assembly task network for assembly tasks (operation 800). The assembly task network includes the assembly tasks for assembling components in a product, and the assembly task network defines dependencies between the assembly tasks.

Next, the process calculates a probability of a group of downstream delays as a function of a state of assembly of components for a product being manufactured using a state of the assembly tasks (operation 802). The state may be, for example, scheduled but not started, not scheduled, in progress, completed, or some other state.

A determination is made as to whether the group of downstream delays is undesirable (operation 804). If the group of downstream delays is undesirable, the process modifies incomplete assembly tasks for the product that reduce the group of downstream delays (operation 806) with the process terminating thereafter. Otherwise, the process terminates.

The process in FIG. 8 may be performed in real time. For example, a manufacturing assembly monitor may be configured to receive task data in real time and update the assembly task network with the task data. In this manner, updates to the assembly task network may be made as quickly as possible without intended delays.

Figure 9:
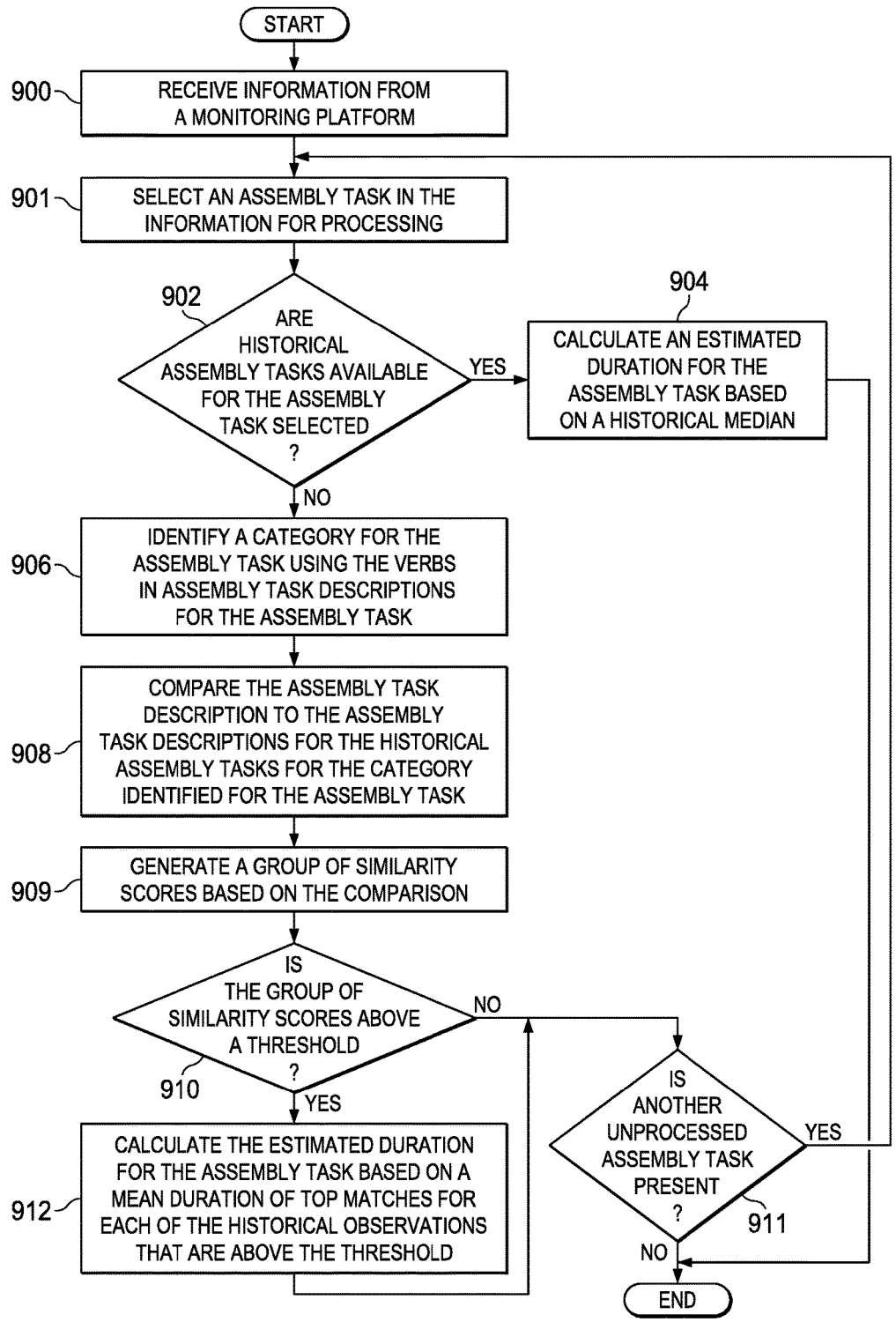
FIG. 9 is an illustration of a flowchart of a process for estimating task durations in accordance with an illustrative embodiment.

With reference next to FIG. 9, an illustration of a flowchart of a process for estimating task durations is depicted in accordance with an illustrative embodiment. The process illustrated in FIG. 9 may be performed by assembly task network analyzer 114 in FIGS. 1-3.

The process begins by receiving information from a monitoring platform (operation 900). A monitoring platform is a component in hardware, software, or some combination thereof that monitors the assembly of components to form a product. An example of a monitoring platform is manufacturing assembly monitor 112 in FIG. 1. The information received may be a status of assembly tasks for the product. This information may be entered by operators, recorded by sensor systems, or other suitable sources.

The process selects an assembly task in the information for processing (operation 901). Next, the process determines whether historical assembly tasks are available for the assembly task selected (operation 902). A historical assembly task is an assembly task that has been performed one or more times in the past. As depicted, the historical assembly tasks include prior data about the assembly of components. This prior data indicates the duration of assembly tasks performed to assemble the components.

If the historical assembly tasks are available, the process calculates an estimated duration for the assembly task based on a historical median (operation 904). The process terminates thereafter. In a dataset, half of the values fall below the median and the other half are above the median.

With reference again to operation 902, if the historical assembly tasks are not available, the process identifies a category for the assembly task using the verbs in assembly task descriptions for the assembly task (operation 906). In operation 906, an assembly task description is the description of the operations to be performed for the assembly task. The assembly task description includes verbs that can be placed into categories. The categories include, for example, "inspect", "repair", "install", and other suitable categories.

The process then compares the assembly task description to the assembly task descriptions for the historical assembly tasks for the category identified for the assembly task (operation 908). In operation 908, text in the assembly task descriptions is run through a preprocessing algorithm where the text is cleansed and stemmed and all stopwords are removed. Then, the assembly task description and the historical assembly task are compared.

Next, the process generates a group of similarity scores based on the comparison (operation 909). In this example, a string similarity score is calculated. This calculation may be performed using the restricted Damerau-Levenshtein distance formula for each comparison. The Damerau-Levenshtein distance is based on the Levenshtein distance and also allows transposition of adjacent characters. Here, each substring may be edited only once. For example, assembly task "FAD2BPNTM1132" has no historical information but it has a description of "Install FWD LH One World Logo". This assembly task description is run through a matching algorithm and a match was made to the assembly task called "FAD2BPNTM1139" which has a description of "Install FWD LH Skyteam Logo". This match provides an estimate of duration of the assembly task based off the similar assembly task that has been previously performed.

Next, a determination is made as to whether the group of the similarity scores is above a threshold (operation 910). The threshold may be set based on the degree of accuracy that is desired. For example, a default threshold of 0.7 may be set if no other values are provided. This threshold of 0.7 means that the descriptions have to match with 70% accuracy based on the restricted Damerau-Levenshtein distance formula. In this illustrative example, any value between 0 and 1 can be set.

If the group of similarity scores is not above a threshold, the process determines whether another unprocessed assembly task is present (operation 911). If another assembly task is present, the process returns to operation 901. Otherwise, the process terminates.

With reference again to operation 910, if the group of similarity scores is above the threshold, the process calculates the estimated duration for the assembly task based on a mean duration of top matches for each of the historical observations that are above the threshold (operation 912). The process proceeds to operation 911 as described above. The mean duration is the average duration of the top matches. As depicted, the top matches for all of the matches are above the threshold.

Figure 10:
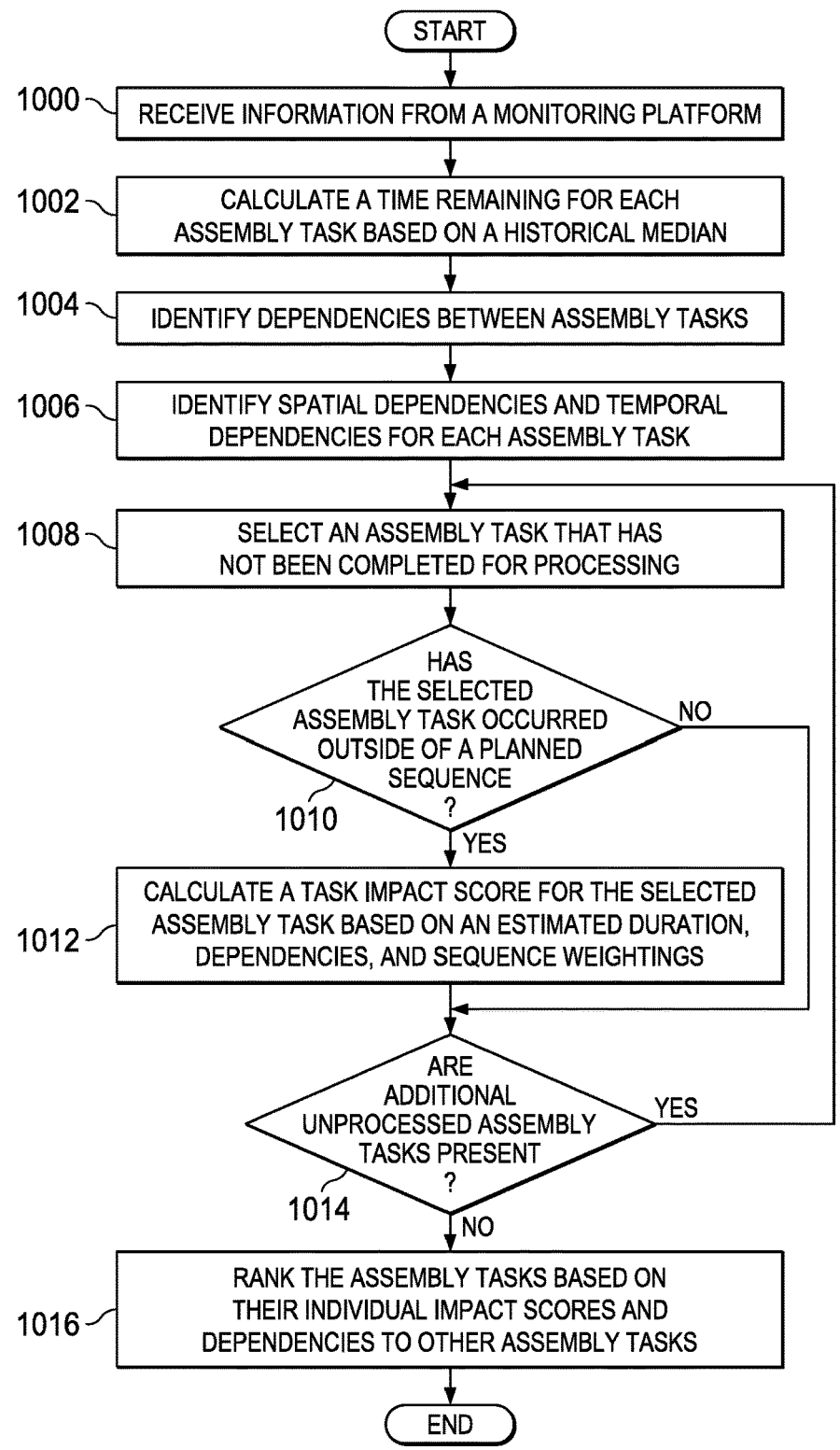
FIG. 10 is an illustration of a flowchart of a process ranking tasks in accordance with an illustrative embodiment.

With reference to FIG. 10, an illustration of a flowchart of a process of ranking tasks is depicted in accordance with an illustrative embodiment. The process illustrated in FIG. 10 may be implemented in assembly task network analyzer 114 in FIGS. 1-3. The ranking of the assembly tasks may provide insight on priority assembly tasks that should be performed before others. For example, the assembly tasks with the most risk to causing delays are ranked the highest. The process begins by receiving information from a monitoring platform (operation 1000).

In operation 1000, the information received from the monitoring platform is a list of the assembly tasks that need to be performed. Additionally, the information about these assembly tasks includes at least one of an airplane number, a job description, missing parts, (x,y,z) coordinates, a median duration, a total duration worked so far, constrained and constraining jobs, a start time, a scheduled completion time, an intended location to be worked, a scheduled delivery date, or other suitable information. These values are used to calculate at least one of whether an assembly task has traveled, the estimated duration remaining, spatial constraints, precedence constraints, assembly tasks that are behind schedule, or other suitable metrics.

Next, the process calculates a time remaining for each assembly task based on a historical median (operation 1002). The process then identifies dependencies between the assembly tasks (operation 1004). In this particular example, the dependencies are limitations or specifications as to how the assembly task is performed.

Afterwards, the process identifies spatial dependencies and temporal dependencies for each assembly task {operation 1006). In this example, the temporal dependencies are limitations in time when the assembly tasks that have been identified as being dependent may be performed. The spatial dependencies are constraints on where the assembly tasks can be performed. For example, a spatial dependency for an assembly task may be based on at least one of distance, assembly location, or some other spatial measurement with respect to another assembly task with which the special dependency has been identified. The spatial dependency may be based on whether another assembly task is scheduled to be worked within the same location or some distance near the location of the assembly task.

The process then selects an assembly task that has not been completed for processing (operation 1008). A determination is made as to whether the selected assembly task has occurred outside of a planned sequence (operation 1010). A planned sequence is an order of when the assembly tasks need to be performed relative to other assembly tasks. If the selected assembly task has occurred outside of the planned sequence, the process calculates a task impact score for the selected assembly task based on an estimated duration, dependencies, and sequence weightings (operation 1012). In operation 1012, the estimated duration is an estimated duration for an assembly task as calculated in the flowchart. A task impact score represents the overall impact an assembly task has on the on-time completion of the airplane. The impact score calculation may be calculated as follows:
SCORE=INITIAL SCORE−0.15×DEPENDENT ASSEMBLY TASK SCORE+(0.25×DEPENDENT ASSEMBLY TASK SCORE), where
INITIAL SCORE=(0.30×TRAVELER×TRAVELED DURATION)+(0.20×DURATION)+(0.1×SPATIAL DEPENDENCY).

The variables in the equation are defined as follows: TRAVELER: assembly task has a value of 1 if the assembly task is a traveled assembly task, otherwise TRAVELED_DURATION: based on days until scheduled completion (DUSC) of an assembly task. Negative and positive DUSC's are scored separately. As depicted, the scoring is determined through k-means clustering. A negative DUSC occurs when the current day is later than the scheduled completion date for the assembly task. The assembly task is given a value of 0.5-1. As the DUSC becomes increasingly negative, the score becomes closer to 1. A positive DUSC is given a score of 0.1-0.5, wherein the lower the DUSC value, the closer to 0.5. DURATION: based on estimated duration remaining (EDR) of an assembly task. Negative and positive EDR's are scored separately. The scoring is determined through k-means clustering. A negative EDR occurs when a duration of an assembly task that has been performed has taken longer than the median historical worked duration for that assembly task. The assembly task is given a value of 0.5-1, wherein the more negative the EDR, the closer the score is to 1. A positive EDR is given a score of 0.1-0.5, wherein the higher the EDR, the closer to 0.5. SPATIAL_CONSTRAINT: specified by whether there is another assembly task scheduled to be worked in the same vicinity and time frame of the current assembly task. The assembly task has a value of 1 if there is a spatial constraint. Otherwise, the value is zero. CONSTRAINED ASSEMBLY TASK_SCORE: the current assembly task cannot be completed until the dependent assembly task is completed. If a dependent assembly task is present, its initial score is taken. Otherwise, the value is zero. DEPENDENT_ASSEMBLY TASK_SCORE: the current assembly task that is preventing a dependent assembly task from being completed. If the dependent assembly task is present, the initial score of the assembly task is taken. Otherwise, the value is zero.

Next, a determination is made as to whether additional unprocessed assembly tasks are present (operation 1014). If additional unprocessed assembly tasks are present, the process returns to operation 1008.

Otherwise, the process ranks the assembly tasks based on their individual impact scores and dependencies to other assembly tasks (operation 1016) with the process terminating thereafter. With reference to operation 1010, if the selected assembly task has not occurred outside of the planned sequence, the process proceeds to operation 1014 as described above.

Figure 11:
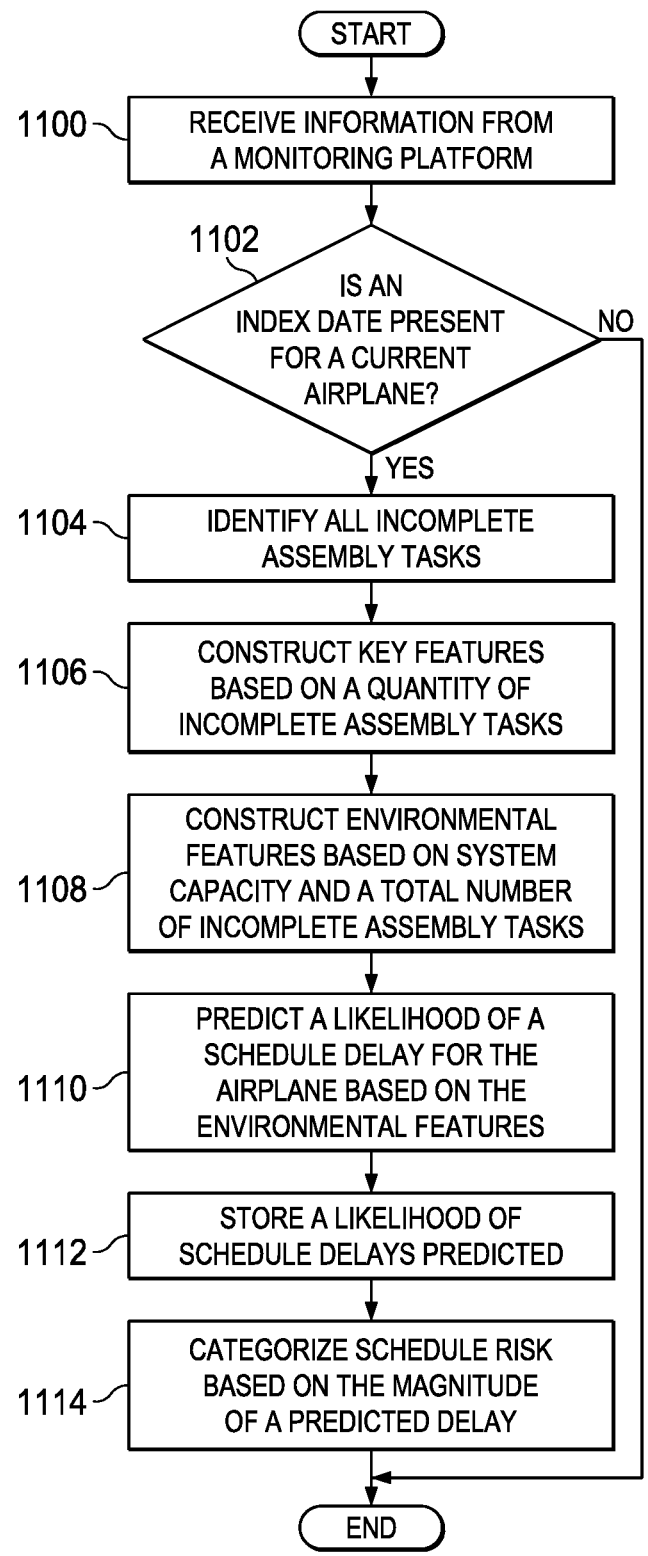
FIG. 11 is an illustration of a flowchart of a process for predicting ways in milestones in accordance with an illustrative embodiment.

Turning to FIG. 11, an illustration of a flowchart of a process for predicting ways in milestones is depicted in accordance with an illustrative embodiment. The process illustrated in FIG. 11 may be implemented in assembly task network analyzer 114 in FIGS. 1-3 to predict when downstream delays 136 in FIG. 1 may affect one or more milestones 146 in FIG. 1.

The process begins by receiving information from a monitoring platform (operation 1100). In this example, the monitoring platform may be manufacturing assembly monitor 112 in FIG. 1. In operation 1100, the information received by the monitoring platform may include a current status of each assembly task, planned production milestone dates, actual production milestone dates, or other suitable information.

The process then determines whether an index date is present for a current airplane (operation 1102). If an index date is not present, the process terminates. In operation 1102, the index date is the point in the production process when the prediction about whether milestones can be met is made. For example, the likelihood of a first test flight being delayed is predicted as soon as the airplane starts delivery operations. In this case, the index date is the day that the delivery operations start.

If the index date is present for the current airplane, the process identifies all incomplete assembly tasks (operation 1104). The process then constructs key features based on a quantity of incomplete assembly tasks (operation 1106). All incomplete assembly tasks are first grouped according to their assigned work package. A work package is a predefined collection of assembly tasks that are related to each other based on at least one of what components are installed, where the assembly tasks occur on the airplane (proximity to each other), or the position of the airplane in the production system. Within each work package grouping, the assembly tasks are then grouped according to their task types to form key features. The task types may be selected from at least one of standard work, rework, engineering changes, customer inspection items, or other types of assembly tasks.

Next, the process constructs environmental features based on system capacity and a total number of incomplete assembly tasks (operation 1108). For the environmental features, the total work in process (WIP) inventory in the production system at the time the airplane enters the system is calculated. This result indicates how many other airplanes are currently in work and thus competing for resources. The number of the assembly tasks that are behind schedule for the production system as a whole is calculated. In this example, a three day average or an average over the previous three days is used. This average is used as a proxy for the health of the overall production system and to determine how health is trending.

Afterwards, the process predicts a likelihood of a schedule delay for the airplane based on the environmental features (operation 1110). In operation 1110, the likelihood of delay can be predicted using the following machine-learning process. Training data may be constructed which consists of historical observations, such as airplanes, that have been delivered. For those airplanes, the features are known. These features may be incomplete assembly tasks at each stage in the production process. A machine-learning model (a supervised regression model) is trained to learn a function which maps input features (incomplete assembly tasks) to a target variable (the expected milestone delay in days). Once this function is learned, predictions may be made for new airplanes about predicted milestone delays.

Next, the process stores a likelihood of schedule delays predicted (operation 1112). The value in operation 1112 is stored for later comparison with actual performance monitoring. In operation 1112, the comparison may be made by comparing the error between the predicted delay and the actual delay for a milestone. This type of comparison allows for monitoring the accuracy of our predictions over time to assess how the predictive model can be improved.

The process then categorizes schedule risk based on the magnitude of a predicted delay (operation 1114). In the list of examples, the categorization of the risk may be based on the predicted delay. For example, a low risk may be a predicted delay of two days or less; a medium risk may be a predicted delay of five days or less; and a high risk may be a predicted delay of greater than five days. The process terminates thereafter. In the illustrative example, the predictive model outputs the number of days the milestone is expected to be delayed. The number of days is mapped to a risk level. This type of mapping allows customers to compare the relative risk between two airplanes (high vs. low) rather than the absolute difference (i.e. the exact number of days one airplane's milestone is expected to slide versus another airplane).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
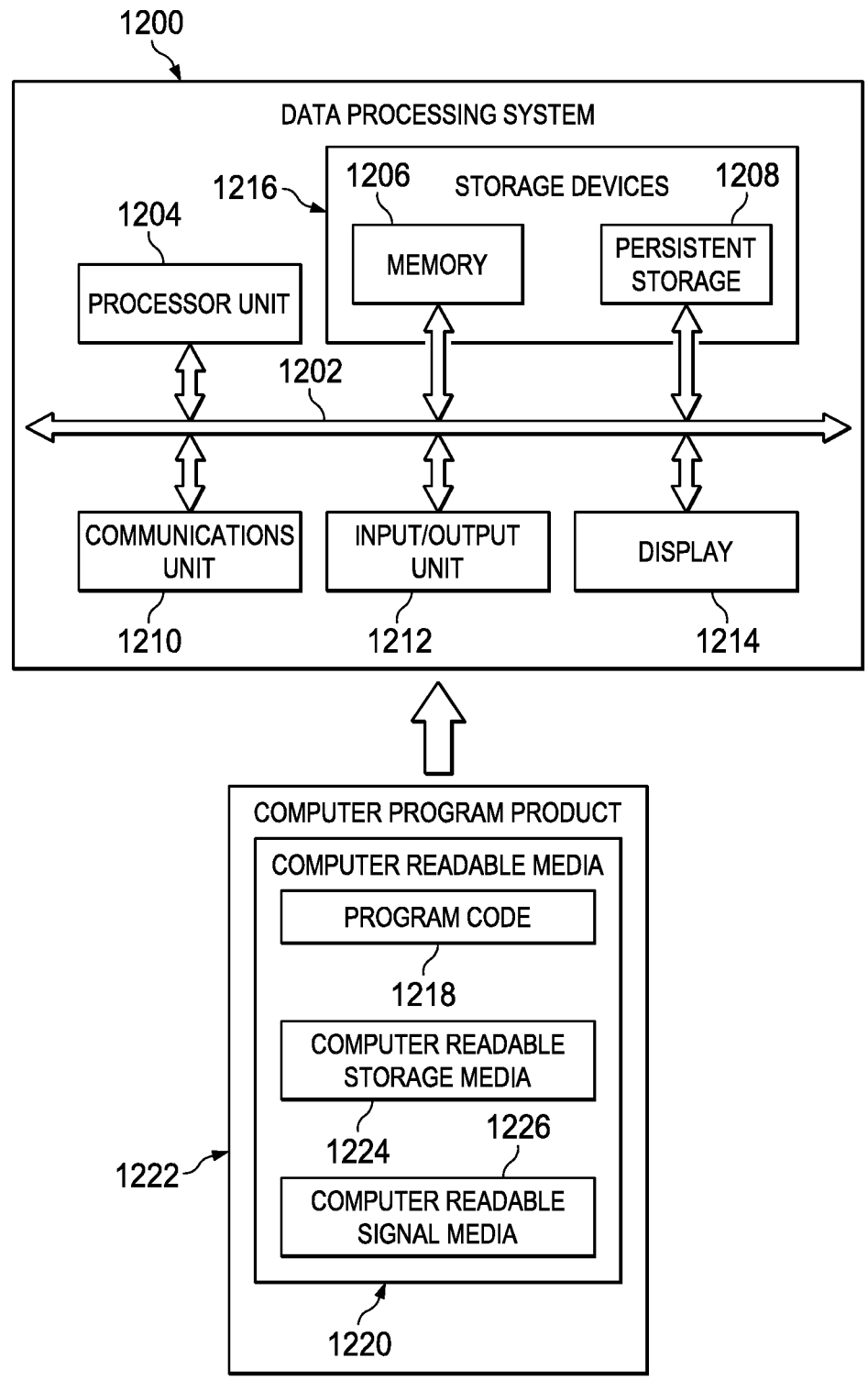
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 150 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226. In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Figure 13:
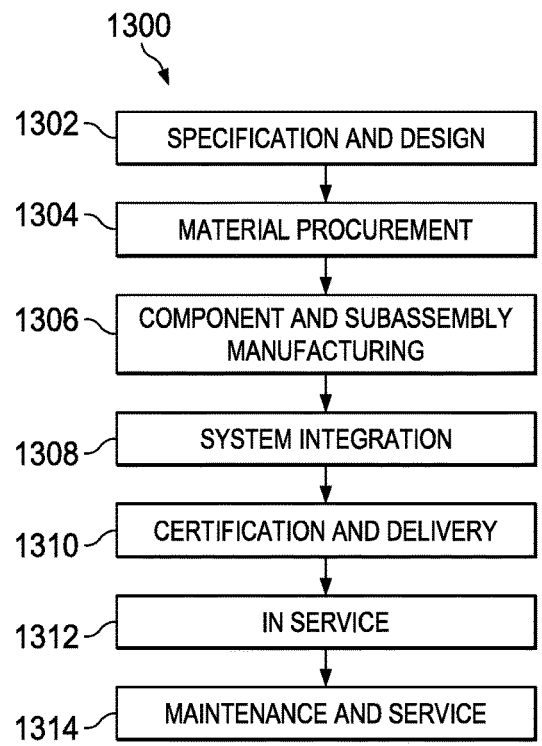
FIG. 13 is an illustration of a block diagram of an aircraft manufacturing and service method in accordance with an illustrative embodiment.
Figure 14:
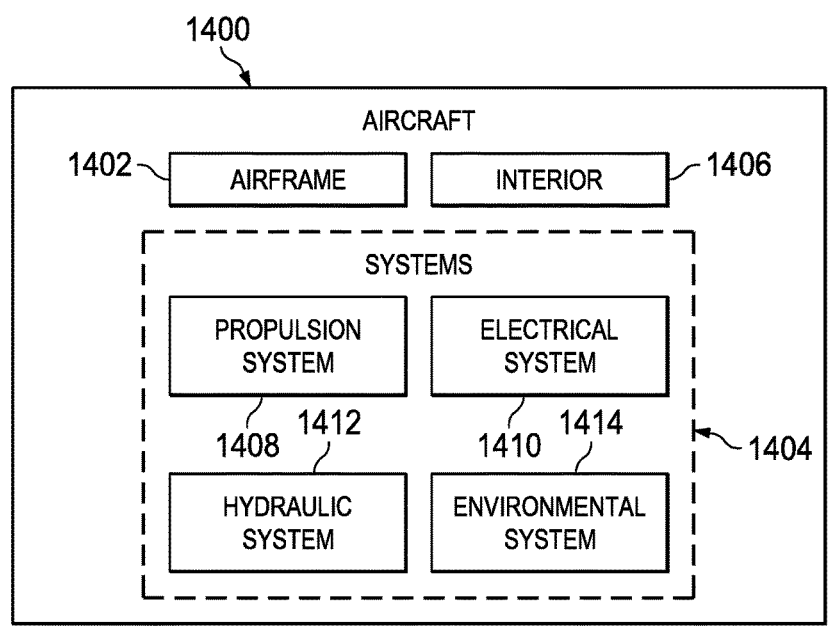
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. For example, assembly task network analyzer 114 in FIGS. 1-3 may be used to determine when assembly tasks 120 in FIG. 1 for assembling components for aircraft 1400 may impact the ability to meet milestones for manufacturing of aircraft 1400.

As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. For example, assembly task network analyzer 114 may be used to analyze assembly test to determine whether downstream delays may be present that affect milestones during maintenance and service 1314. These milestones may be used for performing normal maintenance, upgrades, or other tasks that means both milestones.

The use of a number of the different illustrative embodiments may substantially expedite the assembly of aircraft 1400, reduce the cost of aircraft 1400, or both expedite the assembly of aircraft 1400 and reduce the cost of aircraft 1400. Assembly task network analyzer 114 in FIGS. 1-3 enables an ability to modify the complete assembly tasks in a manner that reduces the likelihood that a milestone may be missed. As result, reductions in delays and expenses may occur.

Figure 15:
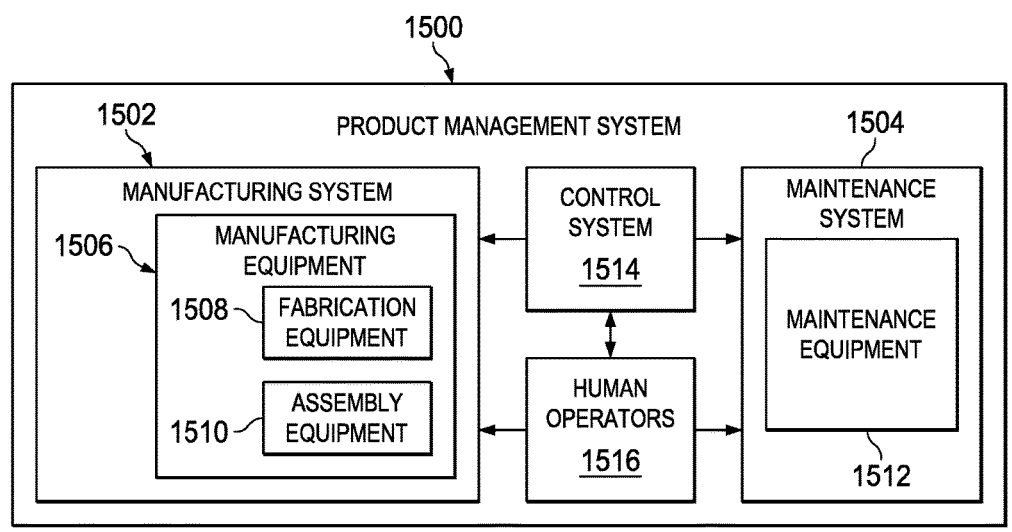
FIG. 15 is an illustration of a block diagram of a product management system in accordance with an illustrative embodiment.

Turning now to FIG. 15, an illustration of a block diagram of a product management system is depicted in accordance with an illustrative embodiment. Product management system 1500 is a physical hardware system. In this illustrative example, product management system 1500 may include at least one of manufacturing system 1502 or maintenance system 1504.

Manufacturing system 1502 is configured to manufacture products, such as aircraft 1400 in FIG. 14. As depicted, manufacturing system 1502 includes manufacturing equipment 1506. Manufacturing equipment 1506 includes at least one of fabrication equipment 1508 or assembly equipment 1510.

Fabrication equipment 1508 is equipment that may be used to fabricate components for parts used to form aircraft 1400. For example, fabrication equipment 1508 may include machines and tools. These machines and tools may be at least one of a drill, a hydraulic press, a furnace, a mold, a composite tape laying machine, a vacuum system, a lathe, or other suitable types of equipment. Fabrication equipment 1508 may be used to fabricate at least one of metal parts, composite parts, semiconductors, circuits, fasteners, ribs, skin panels, spars, antennas, or other suitable types of parts.

Assembly equipment 1510 is equipment used to assemble parts to form aircraft 1400. In particular, assembly equipment 1510 may be used to assemble components and parts to form aircraft 1400. Assembly equipment 1510 also may include machines and tools. These machines and tools may be at least one of a robotic arm, a crawler, a faster installation system, a rail-based drilling system, or a robot. Assembly equipment 1510 may be used to assemble parts such as seats, horizontal stabilizers, wings, engines, engine housings, landing gear systems, and other parts for aircraft 1400.

In this illustrative example, maintenance system 1504 includes maintenance equipment 1512. Maintenance equipment 1512 may include any equipment needed to perform maintenance on aircraft 1400. Maintenance equipment 1512 may include tools for performing different operations on parts on aircraft 1400. These operations may include at least one of disassembling parts, refurbishing parts, inspecting parts, reworking parts, manufacturing replacement parts, or other operations for performing maintenance on aircraft 1400. These operations may be for routine maintenance, inspections, upgrades, refurbishment, or other types of maintenance operations.

In the illustrative example, maintenance equipment 1512 may include ultrasonic inspection devices, x-ray imaging systems, vision systems, drills, crawlers, and other suitable device. In some cases, maintenance equipment 1512 may include fabrication equipment 1508, assembly equipment 1510, or both to produce and assemble parts that may be needed for maintenance.

Product management system 1500 also includes control system 1514. Control system 1514 is a hardware system and may also include software or other types of components. Control system 1514 is configured to control the operation of at least one of manufacturing system 1502 or maintenance system 1504. In particular, control system 1514 may control the operation of at least one of fabrication equipment 1508, assembly equipment 1510, or maintenance equipment 1512.

The hardware in control system 1514 may be using hardware that may include computers, circuits, networks, and other types of equipment. The control may take the form of direct control of manufacturing equipment 1506. For example, robots, computer-controlled machines, and other equipment may be controlled by control system 1514. In other illustrative examples, control system 1514 may manage operations performed by human operators 1516 in manufacturing or performing maintenance on aircraft 1400. For example, control system 1514 may assign tasks, provide instructions, display models, or perform other operations to manage operations performed by human operators 1516. In these illustrative examples, manufacturing controller 108, including assembly task network analyzer 114 in FIGS. 1-3, may be implemented in control system 1514 to manage at least one of the manufacturing or maintenance of aircraft 1400 in FIG. 14. For example, assembly task network analyzer 114 may be used to modify incomplete assembly tasks that may be performed in at least one of manufacturing system 1502 or maintenance system 1504.

In the different illustrative examples, human operators 1516 may operate or interact with at least one of manufacturing equipment 1506, maintenance equipment 1512, or control system 1514. This interaction may be performed to manufacture aircraft 1400.

Of course, product management system 1500 may be configured to manage other products other than aircraft 1400. Although product management system 1500 has been described with respect to manufacturing in the aerospace industry, product management system 1500 may be configured to manage products for other industries. For example, product management system 1500 may be configured to manufacture products for the automotive industry as well as any other suitable industries.

Thus the illustrative embodiments provide one or more technical solutions that overcome a technical problem with reducing delays in manufacturing of product 104 in FIG. 1. One or more technical solutions may provide a technical effect of enabling a reduction in delays such as downstream delays 136 that may affect a group of milestones 146 for manufacturing of product 104, such as aircraft 106 in FIG. 1. In FIG. 1, assembly task network analyzer 114 may enable modifications 148 to incomplete assembly tasks 138 that may reduce downstream delays 136 manner that reduces the likelihood that a group of milestones 146 may be missed.

As a result, computer system 150 in FIG. 1 operates as a special purpose computer system in which assembly task network analyzer 114 in computer system 150 enables reducing downstream delays 136. In particular, assembly task network analyzer 114 transforms computer system 150 into a special purpose computer system as compared to currently available general computer systems that do not have assembly task network analyzer 114.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A manufacturing controller comprising:
  a data storage device configured to store an assembly task network including assembly tasks for assembling components in a product, wherein the assembly task network is a data structure that defines dependencies between the assembly tasks; and
  an assembly task network analyzer configured to search the assembly task network for the assembly tasks and calculate a probability of a group of downstream delays as a function of a state of assembly of the components for the product being manufactured using the assembly tasks, enabling modifying incomplete assembly tasks for the product that reduces the group of downstream delays.

2. The manufacturing controller of claim 1 further comprising:
  a manufacturing assembly monitor configured to receive task data in real time and update the assembly task network with the task data.

3. The manufacturing controller of claim 2, wherein the task data includes the state of assembly of the components for the product being manufactured.

4. The manufacturing controller of claim 1, wherein the assembly task network analyzer is configured to identify a milestone in danger of being delayed based on a state of a cluster of the assembly tasks for the milestone.

5. The manufacturing controller of claim 4, wherein the cluster is selected from one of a spatial cluster and a system cluster.

6. The manufacturing controller of claim 4, wherein the assembly task network analyzer identifies a group of modifications to the incomplete assembly tasks for the product that reduces the group of downstream delays.

7. The manufacturing controller of claim 4 further comprising:
  a display system in communication with the assembly task network analyzer; and
  wherein the assembly task network analyzer displays the product and graphical indicators graphically indicating the state of assembly for each of the assembly tasks on the display system.

8. The manufacturing controller of claim 7, wherein the assembly task network analyzer displays the product as a point cloud in which each point in the point cloud represents a component assembled by a group of the assembly tasks.

9. The manufacturing controller of claim 1, wherein the assembly task network analyzer identifies the probability of the group of downstream delays for a group of milestones for the product.

10. The manufacturing controller of claim 9, wherein the product is an aircraft and the group of milestones is selected from at least one of critical design review, an engine test, a first flight, a certification, a delivery to a customer, movement to a manufacturing area, movement out of the manufacturing area, painting an airplane with an airplane livery, or a first fueling of the airplane to check for fuel leaks.

11. The manufacturing controller of claim 1, wherein the assembly task network defines at least one of a predecessor dependency in the dependencies, a successor dependency in the dependencies, a planned completion, a planned start, a planned duration, a resource requirement, or a work location.

12. The manufacturing controller of claim 1, wherein the components are selected from at least one of a part, an assembly of parts, a subassembly of the parts, a system, or a subsystem.

13. The manufacturing controller of claim 1, wherein the product is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, a building, an engine, and a turbine.

14. A manufacturing controller for an aircraft comprising:
  a data storage device configured to store an assembly task network including assembly tasks for assembling components in the aircraft, wherein the assembly task network is a data structure that defines dependencies between assembly tasks;
  a manufacturing assembly monitor configured to receive task data in real time and update the assembly task network with the task data, wherein the task data includes a state of assembly of the components for a product being manufactured; and
  an assembly task network analyzer configured to search the assembly task network for the assembly tasks and calculate a probability of a group of downstream delays as a function of the state of assembly of the components for the product being manufactured identified from a state of the assembly tasks; and identify a milestone in danger of being delayed based on the state of a cluster of the assembly tasks for the milestone, enabling modifying incomplete assembly tasks for the product that reduce the group of downstream delays.

15. The manufacturing controller for the aircraft of claim 14, wherein the cluster is selected from one of a spatial cluster and a system cluster.

16. The manufacturing controller for the aircraft of claim 14, wherein the assembly task network analyzer identifies a group of modifications to the incomplete assembly tasks for the product that reduce the group of downstream delays.

17. The manufacturing controller for the aircraft of claim 14 further comprising:
  a display system in communication with the assembly task network analyzer; and
  wherein the assembly task network analyzer displays the product and graphical indicators graphically indicating the state of assembly for each of the assembly tasks on the display system.

18. The manufacturing controller for the aircraft of claim 17, wherein the assembly task network analyzer displays the product as a point cloud in which each point in the point cloud represents an assembly task in the assembly tasks.

19. The manufacturing controller for the aircraft of claim 14, wherein the assembly task network analyzer identifies the probability of the group of downstream delays for a group of milestones for the product.

20. The manufacturing controller for the aircraft of claim 19, wherein the product is the aircraft and the group of milestones is selected from at least one of an engine run, a first flight, a certification, or a delivery to a customer.

21. The manufacturing controller for the aircraft of claim 14, wherein the assembly task network defines at least one of a predecessor dependency in the dependencies, a successor dependency in the dependencies, a planned completion, a planned start, a planned duration, a resource requirement, or a work location.

22. The manufacturing controller for the aircraft of claim 14, wherein the components are selected from at least one of a part, an assembly of parts, a subassembly of the parts, a system, or a subsystem.

23. A method for monitoring manufacturing of a product, the method comprising:
    searching, by a computer system, a data storage device configured to store an assembly task network for assembly tasks for assembling, wherein the assembly task network is a data structure that defines dependencies between the assembly tasks; and
    calculating, by the computer system, a probability of a group of downstream delays as a function of a state of assembly of components for the product being manufactured using a state of the assembly tasks, enabling modifying incomplete assembly tasks for the product that reduce the group of downstream delays.

24. The method of claim 23 further comprising:
    receiving task data in real time and updating the assembly task network with the task data.

25. The method of claim 24, wherein the task data includes the state of assembly of components for the product being manufactured.

26. The method of claim 23 further comprising:
    identifying a milestone in danger of being delayed based on the state of a cluster of the assembly tasks for the milestone.

27. The method of claim 26, wherein a cluster is selected from one of a spatial cluster and a system cluster.

28. The method of claim 26 further comprising:
    identifying a group of modifications to the incomplete assembly tasks for the product that reduces the group of downstream delays.

29. The method of claim 26 further comprising:
    displaying the product and graphical indicators graphically indicating the state of assembly for each of the assembly tasks on a display system.

30. The method of claim 29, wherein an assembly task network analyzer displays the product as a point cloud in which each point in the point cloud represents a component assembled by a group of the assembly tasks.

31. The method of claim 23, wherein an assembly task network analyzer identifies the probability of the group of downstream delays for a group of milestones for the product.

32. The method of claim 31, wherein the product is an aircraft and the group of milestones is selected from at least one of a critical design review, an engine test, a first flight, a certification, a delivery to a customer, movement to a manufacturing area, movement out of the manufacturing area, painting an airplane with an airplane livery, a first fueling of the airplane to check for fuel leaks.

33. The method of claim 23, wherein the assembly task network defines at least one of a predecessor dependency in the dependencies, a successor dependency in the dependencies, a planned completion, a planned start, a planned duration, a resource requirement, or a work location.

34. The method of claim 23, wherein components are selected from at least one of a part, an assembly of parts, a subassembly of the parts, a system, or a subsystem.

35. The method of claim 23, wherein the product is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, and a building.

36. The manufacturing controller of claim 1, wherein the assembly tasks are ranked based on individual impact scores and dependencies to other assembly tasks, and wherein each individual impact score represents an overall impact the assembly task has on an on-time completion of the product.

37. The manufacturing controller for the aircraft of claim 14, wherein the assembly tasks are ranked based on individual impact scores and dependencies to other assembly tasks, and wherein each individual impact score represents an overall impact the assembly task has on an on-time completion of a product.

38. The method of claim 23, wherein the assembly tasks are ranked based on individual impact scores and dependencies to other assembly tasks, and wherein each individual impact score represents an overall impact the assembly task has on an on-time completion of the product.

* * * * *